United States Patent
Xu et al.

(10) Patent No.: US 11,758,539 B2
(45) Date of Patent: Sep. 12, 2023

(54) ASSISTANCE INFORMATION FOR FAST CARRIER AGGREGATION AND DUAL CONNECTIVITY CONFIGURATION

(71) Applicant: Apple Inc., Cupertino, CA (US)

(72) Inventors: Fangli Xu, Beijing (CN); Dawei Zhang, Saratoga, CA (US); Haijing Hu, Beijing (CN); Yuqin Chen, Shenzhen (CN); Srirang A. Lovlekar, Cupertino, CA (US); Murtaza A. Shikari, Mountain View, CA (US); Sethuraman Gurumoorthy, San Jose, CA (US); Longda Xing, San Jose, CA (US); Srinivasan Nimmala, San Jose, CA (US); Sree Ram Kodali, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 168 days.

(21) Appl. No.: 16/811,599

(22) Filed: Mar. 6, 2020

(65) Prior Publication Data

US 2020/0314836 A1    Oct. 1, 2020

(30) Foreign Application Priority Data

Mar. 28, 2019  (CN) .......................... 201910241846.7

(51) Int. Cl.
*H04W 72/21* (2023.01)
*H04W 76/27* (2018.01)
(Continued)

(52) U.S. Cl.
CPC ............. *H04W 72/21* (2023.01); *H04L 5/001* (2013.01); *H04L 5/0042* (2013.01); *H04W 72/52* (2023.01); *H04W 76/27* (2018.02)

(58) Field of Classification Search
CPC ............. H04W 72/0413; H04W 76/27; H04W 72/0486; H04L 5/001; H04L 5/0042
See application file for complete search history.

(56) References Cited

U.S. PATENT DOCUMENTS

| 9,788,242 B2 | 10/2017 | Nuggehalli |
| 10,484,968 B2 | 11/2019 | Abedini |

(Continued)

FOREIGN PATENT DOCUMENTS

| CN | 107659955 | 2/2018 |
| EP | 3 192 306 B1 | 10/2018 |

(Continued)

OTHER PUBLICATIONS

3GPP TS 38.331 V15.4.0 (Dec. 2018) "RRC protocol specification Release 15" Downloadable from : https://portal.3gpp.org/desktopmodules/Specifications/SpecificationDetails.aspx?specificationId=3197 (Year: 2018).*

(Continued)

*Primary Examiner* — Basil Ma
(74) *Attorney, Agent, or Firm* — Kowert, Hood, Munyon, Rankin & Goetzel, P.C.

(57) ABSTRACT

Apparatuses, systems, and methods for using an assistance information framework to perform fast carrier aggregation and dual connectivity configuration. A wireless device may provide assistance information for determining a carrier aggregation or dual connectivity configuration to a cellular base station. The assistance information may be provided while establishing a radio resource control connection. The assistance information may include either or both of carrier aggregation or dual connectivity preference information for the wireless device or service data amount information for the wireless device. The cellular base station may select a carrier aggregation or dual connectivity configuration for the wireless device based on the assistance information, and (Continued)

may provide configuration information for the selected configuration to the wireless device.

20 Claims, 12 Drawing Sheets

(51) Int. Cl.
*H04L 5/00* (2006.01)
*H04W 72/52* (2023.01)

(56) References Cited

U.S. PATENT DOCUMENTS

| | | | | |
|---|---|---|---|---|
| 2013/0070611 | A1* | 3/2013 | Ahn | H04W 52/286 |
| | | | | 370/328 |
| 2014/0079022 | A1 | 3/2014 | Wang | |
| 2014/0160985 | A1* | 6/2014 | Jung | H04L 5/001 |
| | | | | 370/254 |
| 2015/0223212 | A1* | 8/2015 | Der Velde | H04W 76/15 |
| | | | | 370/329 |
| 2015/0257118 | A1* | 9/2015 | Siomina | G01S 5/021 |
| | | | | 455/456.1 |
| 2015/0327269 | A1* | 11/2015 | Kim | H04W 88/02 |
| | | | | 370/329 |
| 2016/0044566 | A1 | 2/2016 | Nammi | |
| 2016/0234726 | A1* | 8/2016 | Nuggehalli | H04W 36/0022 |
| 2016/0262177 | A1* | 9/2016 | Chuttani | H04L 5/001 |
| 2016/0270139 | A1* | 9/2016 | Rahman | H04W 72/27 |
| 2016/0337904 | A1* | 11/2016 | Hsu | H04W 8/205 |
| 2017/0041940 | A1* | 2/2017 | Falconetti | H04L 5/006 |
| 2017/0118658 | A1* | 4/2017 | Hwang | H04W 16/32 |
| 2017/0325123 | A1* | 11/2017 | Tabet | H04L 5/001 |
| 2017/0331670 | A1 | 11/2017 | Parkvall | |
| 2017/0339555 | A1* | 11/2017 | Henttonen | H04W 76/15 |
| 2018/0034524 | A1* | 2/2018 | Pao | H04W 72/12 |
| 2018/0035436 | A1 | 2/2018 | Sharma | |
| 2018/0124676 | A1 | 5/2018 | Zeng | |
| 2018/0206113 | A1* | 7/2018 | He | H04W 8/24 |
| 2018/0227960 | A1 | 8/2018 | Belghoul | |
| 2019/0037417 | A1* | 1/2019 | Lei | H04W 72/085 |
| 2019/0053324 | A1* | 2/2019 | Tseng | H04W 76/30 |
| 2019/0182639 | A1* | 6/2019 | Basu Mallick | H04W 4/40 |
| 2019/0200414 | A1 | 6/2019 | Abraham | |
| 2019/0342890 | A1* | 11/2019 | Tong | H04W 8/24 |
| 2019/0364492 | A1* | 11/2019 | Azizi | H04W 48/16 |
| 2021/0037594 | A1* | 2/2021 | Dalsgaard | H04W 76/34 |
| 2021/0336755 | A1* | 10/2021 | Xiao | H04W 72/1289 |
| 2022/0116796 | A1* | 4/2022 | Chou | H04L 41/16 |
| 2023/0030473 | A1* | 2/2023 | Yang | H04W 24/10 |

FOREIGN PATENT DOCUMENTS

| | | |
|---|---|---|
| WO | WO2018075828 A1 | 4/2018 |
| WO | 2019047217 | 3/2019 |

OTHER PUBLICATIONS

3GPP TS 38.331 V15.4 Dec. 2018 Excerpts. (Year: 2018).*
Office Action for Cn Application for Invention No. 201910241846.7 dated Feb. 25, 2023.

* cited by examiner

US 11,758,539 B2

ASSISTANCE INFORMATION FOR FAST CARRIER AGGREGATION AND DUAL CONNECTIVITY CONFIGURATION

PRIORITY DATA

This application claims benefit of priority to Chinese Application No. 201910241846.7, titled "Assistance Information for Fast Carrier Aggregation and Dual Connectivity Configuration", filed Mar. 28, 2019, which is hereby incorporated by reference in its entirety as though fully and completely set forth herein.

FIELD

The present application relates to wireless devices, and including to apparatuses, systems, and methods for a wireless device and a cellular base station to use an assistance information framework to perform fast carrier aggregation and dual connectivity configuration.

DESCRIPTION OF THE RELATED ART

Wireless communication systems are rapidly growing in usage. Further, wireless communication technology has evolved from voice-only communications to also include the transmission of data, such as Internet and multimedia content. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

In many instances, a wireless device may be able to communicate using multiple carriers according to a wireless communication technology, or even using multiple such technologies in a coordinated manner. However, determining how best to utilize multiple carriers and/or wireless communication technologies together in a wireless device in a complementary manner may be a complex task. Thus, improvements in the field are desired.

SUMMARY

Embodiments relate to apparatuses, systems, and methods for a wireless device and a cellular base station to use an assistance information framework to perform fast carrier aggregation and dual connectivity configuration.

The carrier aggregation configuration may include provision of multiple cells (e.g., deployed on different, adjacent or separated, frequencies) to a wireless device. The dual connectivity cellular communication system may further support concurrent (or substantially concurrent) connections with multiple nodes of the same generation (e.g., fifth generation new radio (5G NR) network nodes) of cellular communication technology, or of different generations (e.g., 5G NR and LTE) of cellular communication technology, among various possibilities.

According to the techniques described herein, the assistance information may be provided in conjunction with radio resource control (RRC) connection establishment. For example, the assistance information may be provided with a RRC connection request or a RRC resume request. As another possibility, the assistance information may be provided with a RRC connection setup complete message or a RRC resume complete message. The assistance information may include information regarding the wireless device's preference(s) with respect to carrier aggregation and/or dual connectivity configuration, such as whether the wireless device prefers to be configured for carrier aggregation and/or dual connectivity, which frequency or frequencies the wireless device prefers for carrier aggregation and/or dual connectivity, whether a previous carrier aggregation and/or dual connectivity configuration can be used again, and/or a specific carrier aggregation and/or dual connectivity configuration preferred by the wireless device. Additionally or alternatively, the assistance information may include an indication of an estimated amount of data that the wireless device expects to communicate.

Based at least in part on the assistance information, the serving cell of the wireless device may determine whether a carrier aggregation and/or dual connectivity configuration would benefit the wireless device, and (e.g., if so) may select a carrier aggregation and/or dual connectivity configuration for the wireless device and configure the wireless device with the selected carrier aggregation and/or dual connectivity configuration.

Thus, such assistance information may help the network accurately determine whether to configure the wireless device for carrier aggregation and/or dual connectivity configuration, and/or to select a carrier aggregation and/or dual connectivity configuration for the wireless device. Further, provision of the assistance information in conjunction with RRC connection establishment may facilitate a relatively quick carrier aggregation and/or dual connectivity configuration for the wireless device in scenarios in which such a configuration may benefit the wireless device, which may in turn improve the throughput of a wireless device using such an assistance information framework, at least according to some embodiments.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
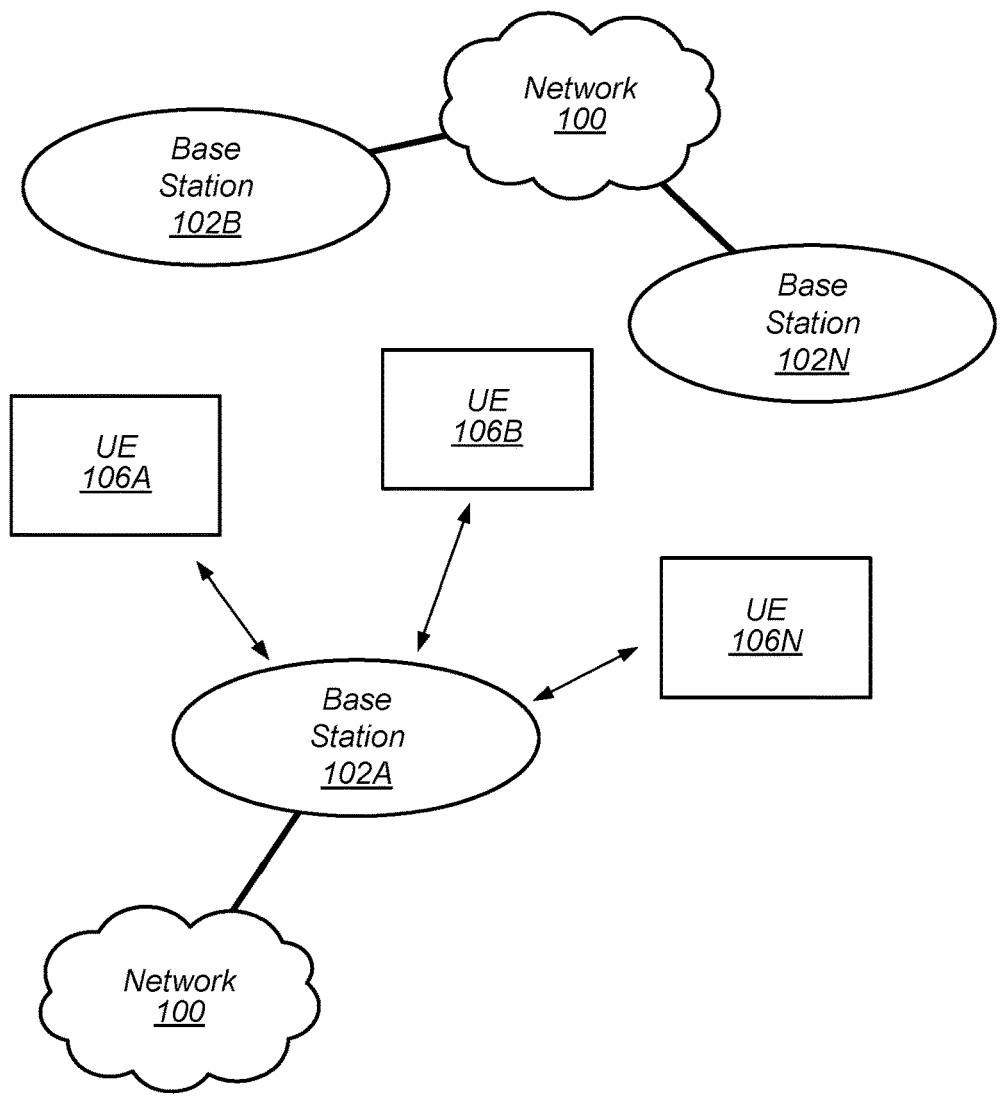
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
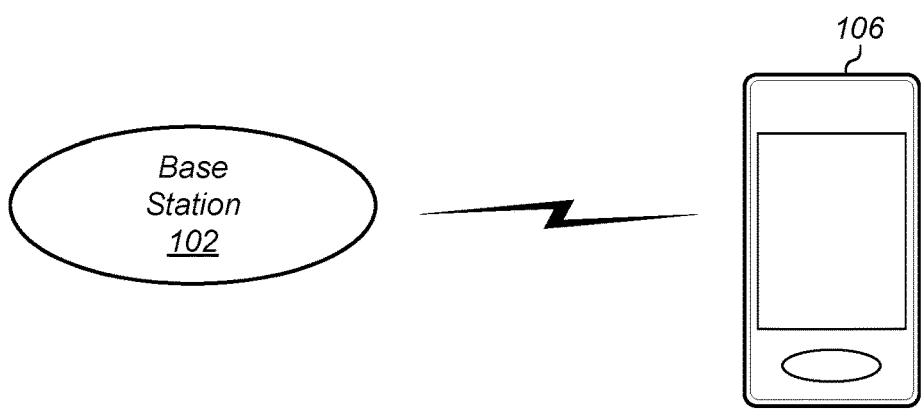
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternatively be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. As another possibility, base station 102A may be a LTE base station, or "eNB". In some embodiments, a eNB may be connected to a legacy evolved packet core (EPC) network and/or to a NR core (NRC) network.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT, or LTE or GSM), and separate radios for communicating using each of Wi-Fi and Bluetooth. Other configurations are also possible.

Figure 3:
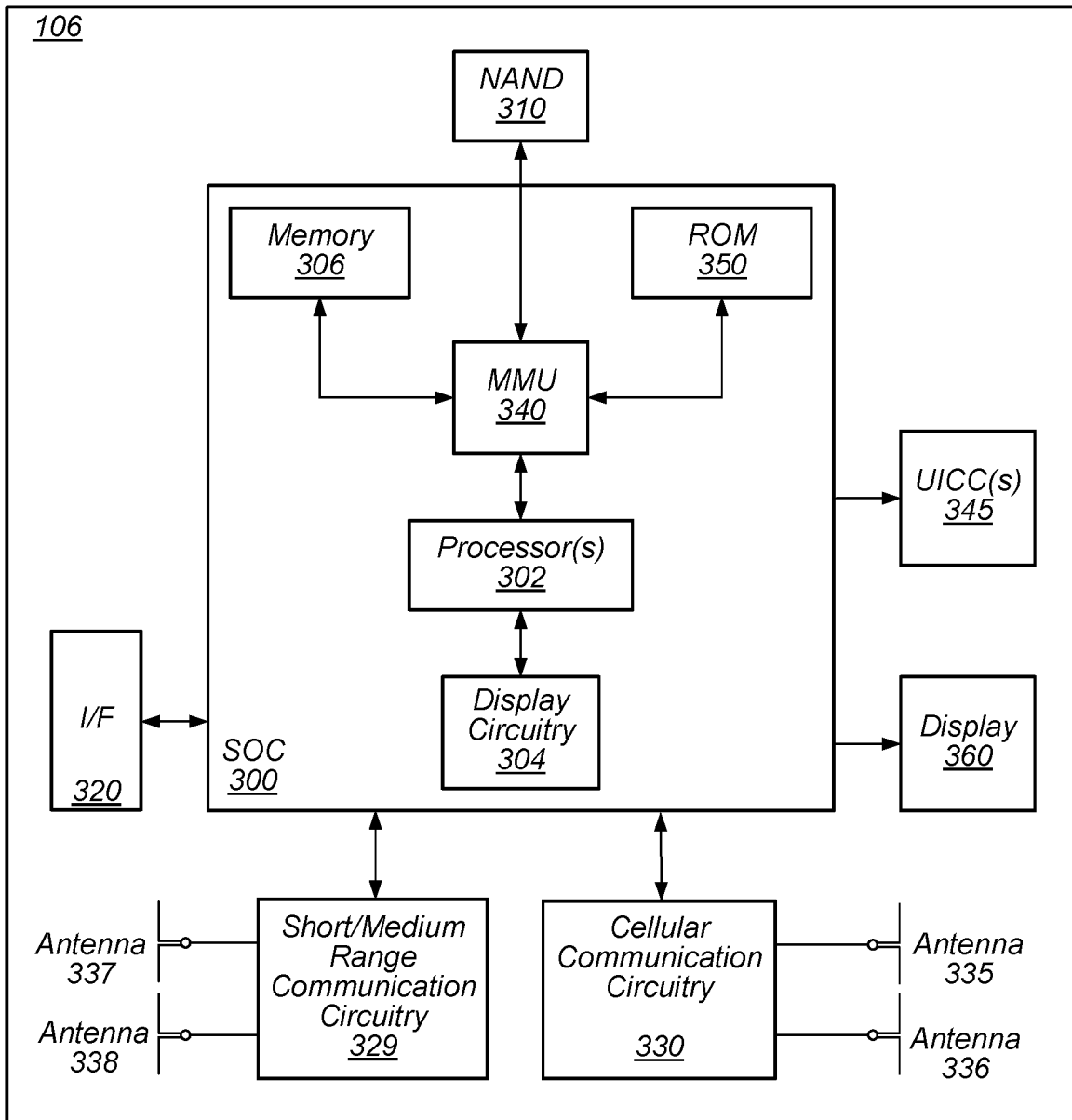
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT (or that also operates according to the first RAT). The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing features for using an assistance information framework to perform fast carrier aggregation and dual connectivity configuration, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 335, 336, 337, 338, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
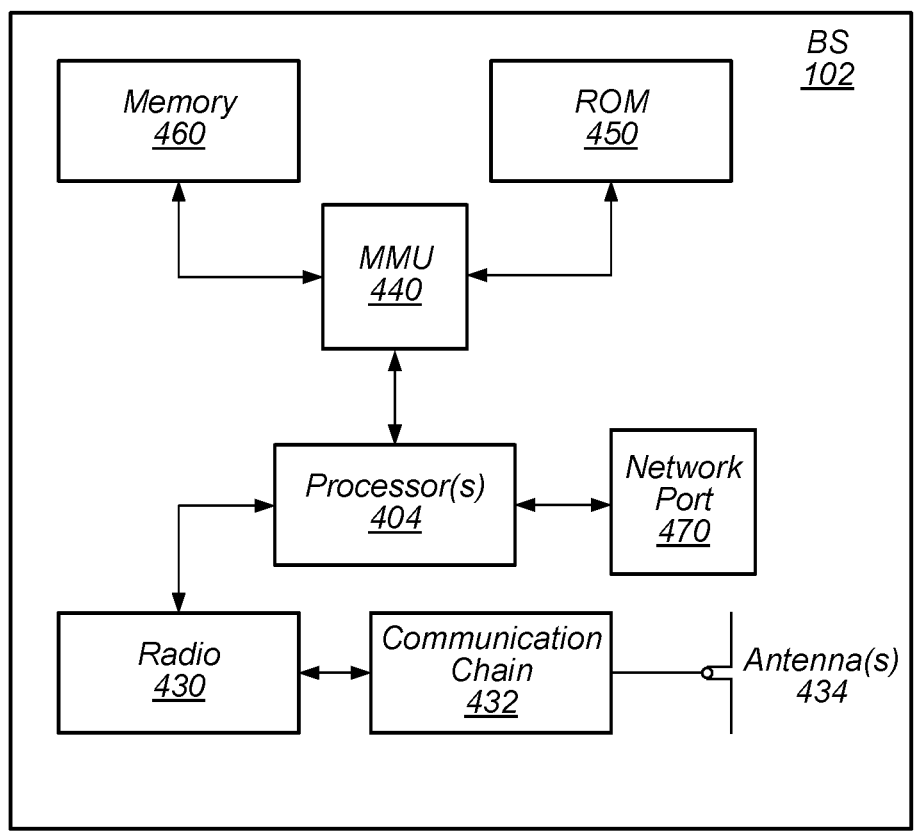
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
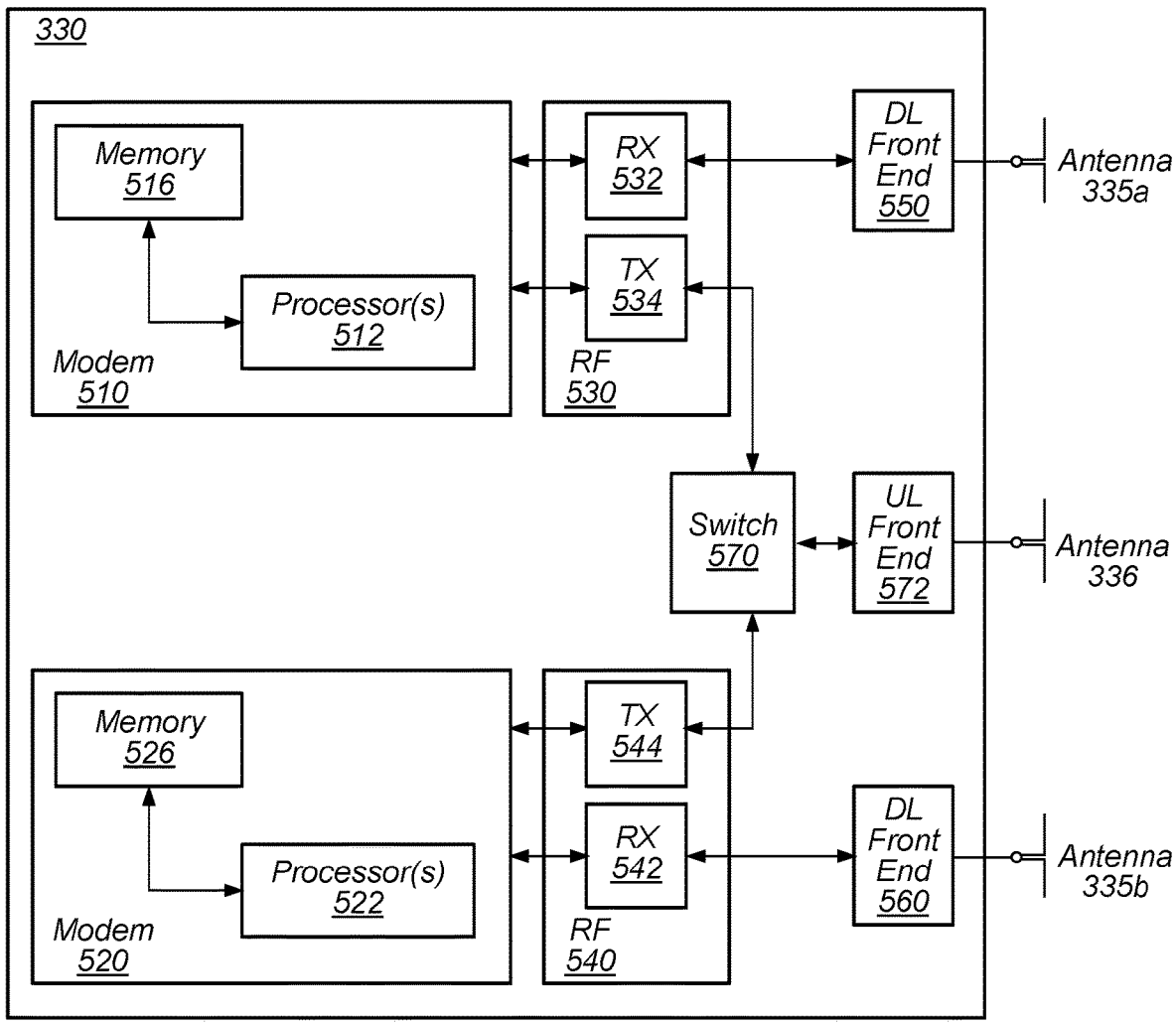
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to some embodiments, cellular communication circuitry 330 may be included in a communication device, such as communication device 106 described above herein. As noted above herein, communication device 106 may be a user equipment (UE) device, a mobile device or mobile station, a wireless device or wireless station, a desktop computer or computing device, a mobile computing device (e.g., a laptop, notebook, or portable computing device), a wearable device, a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to, e.g., communicatively; directly or indirectly), dedicated processors, and/or radios for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, such as LTE or LTE-A, and modem 520 may be configured for communications according to a second RAT, such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using an assistance information framework to perform fast carrier aggregation and dual connectivity configuration, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing features for using an assistance information framework to perform fast carrier aggregation and dual connectivity configuration, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
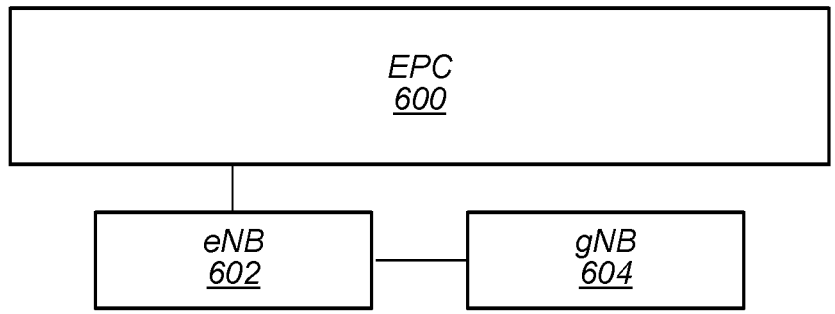
FIG. 6A illustrates an example of connections between an EPC network, an LTE base station (eNB), and a 5G NR base station (gNB), according to some embodiments.
Figure 6B:
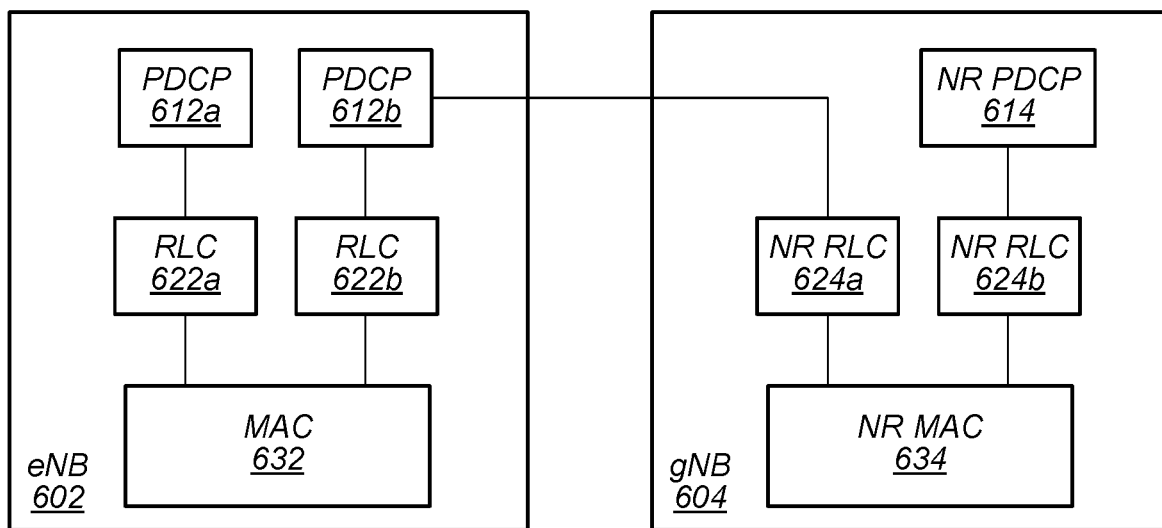
FIG. 6B illustrates an example of a protocol stack for an eNB and a gNB, according to some embodiments.

FIGS. 6A-6B—5G NR Non-standalone (NSA) Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622*a-b*. RLC layer 622*a* may also interface with packet data convergence protocol (PDCP) layer 612*a* and RLC layer 622*b* may interface with PDCP layer 612*b*. Similar to dual connectivity as specified in LTE-Advanced Release 12, PDCP layer 612*a* may interface via a master cell group (MCG) bearer to EPC network 600 whereas PDCP layer 612*b* may interface via a split bearer with EPC network 600.

Additionally, as shown, gNB 604 may include a MAC layer 634 that interfaces with RLC layers 624*a-b*. RLC layer 624*a* may interface with PDCP layer 612*b* of eNB 602 via an X2 interface for information exchange and/or coordination (e.g., scheduling of a UE) between eNB 602 and gNB 604. In addition, RLC layer 624*b* may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Thus, FIGS. 6A-6B may represent aspects of one possible cellular communication system that implements dual connectivity. However, it should be noted that numerous other dual (or more generally multiple) connectivity configurations are also possible, and that features of this disclosure can be implemented any of a variety of such configurations. Some other examples could include a configuration in which a gNB can be configured as a master node and a eNB can be configured as a secondary node, or a configuration in which both a master node and a secondary node operate according to the same RAT (e.g., both operate according to NR, both operate according to LTE, etc.), among various other possible configurations. In some instances, a configuration in which multiple cells (e.g., a primary or master cell (PCELL) and one or more secondary cells (SCELLS) are provided according to the same RAT may also be referred to as a carrier aggregation configuration.

Figure 7:
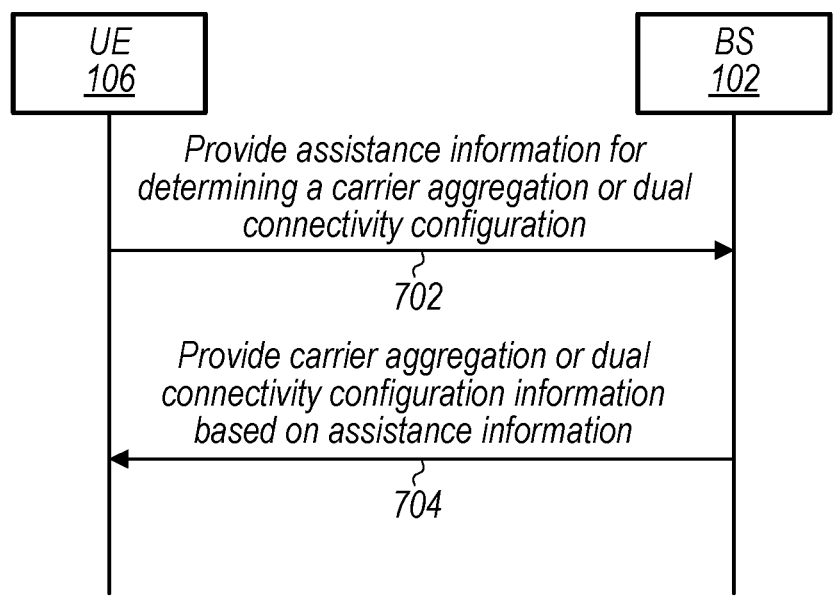
FIG. 7 is a signal flow diagram illustrating an example method for a wireless device and a cellular base station to use an assistance information framework to perform fast carrier aggregation and dual connectivity configuration, according to some embodiments.

FIG. 7—Assistance Information for Fast Carrier Aggregation and Dual Connectivity Configuration FIG. 7 is a flowchart diagram illustrating an example method for a wireless device and a cellular base station to use an assistance information framework to perform fast carrier aggregation and dual connectivity configuration, according to some embodiments. Aspects of the method of FIG. 7 may be implemented by a wireless device and a cellular base station, such as a UE 106 and a BS 102 illustrated in various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the method shown may be performed concurrently, in a different order than shown, may be substituted for by other method elements, or may be omitted. Additional elements may also be performed as desired. As shown, the method may operate as follows.

In 702, the wireless device may provide assistance information for determining a carrier aggregation or dual connectivity configuration to the cellular base station. The assistance information may be provided in conjunction with (e.g., as part of) establishing a radio resource control (RRC) connection with the cellular base station. For example, the assistance information may be provided during a RRC connection setup procedure (e.g., while transitioning from RRC idle to RRC connected mode), or during a RRC resume procedure (e.g., while transitioning from RRC inactive to RRC connected mode. The assistance information could be provided in an initial RRC connection or resume request (e.g., in which case it may be preferable for the assistance information to be relatively compact, to keep the size of the initial request relatively small) at least according to some embodiments), or with a RRC connection set complete or RRC resume complete message. As a still further possibility, the assistance information could be provided separately from the RRC connection setup, e.g., in response to an assistance information request. At least according to some embodiments, such an assistance information request/report exchange may still occur in conjunction with the RRC connection setup (e.g., immediately following the RRC connection setup), if desired; alternatively or in addition, such an assistance information request/report exchange may occur at any of various other times.

The assistance information may include any of various possible types of information that may be useful to the cellular base station to determine whether to configure the wireless device for carrier aggregation or dual connectivity, and to select a carrier aggregation or dual connectivity configuration if it the cellular base station does determine to configure the wireless device for carrier aggregation or dual connectivity. For example, the assistance information may include carrier aggregation or dual connectivity preference information for the wireless device. Such preference information could include a simple (e.g., 1-bit) indication of whether the wireless device prefers to be configured for at least one of carrier aggregation or dual connectivity or to not be configured for either of carrier aggregation or dual connectivity, or a (e.g., 2-bit) indication of the wireless device's preference among being configured for carrier aggregation, dual connectivity, either, or neither. As another possibility, such preference information could include an indication of one or more preferred frequencies for carrier aggregation or dual connectivity, and/or one or more non-preferred frequencies for carrier aggregation or dual connectivity. For example, in some instances, the wireless device may be configured to perform measurements on one or more potential/candidate secondary cell frequencies while in idle or inactive mode, and may accordingly be able to determine whether any such frequencies would be suitable for carrier aggregation or dual connectivity when initially performing RRC connection setup. Alternatively, or in addition, it may be possible for the wireless device to include an indication of whether (e.g., part or all of) a carrier aggregation or dual connectivity configuration with which the wireless device was configured during a previous RRC connection can be reused as part of the assistance information.

As a still further possibility, the wireless device could be provided (e.g., by the cellular base station or a previous serving base station) with information pre-configuring one or more carrier aggregation or dual connectivity configuration indices corresponding to a one or more carrier aggregation or dual connectivity or dual connectivity configurations. The cellular base station may select the possible configurations for which configuration indices are pre-configured based at least in part on wireless device capability information, at least in some instances. Using such information, the wireless device could include an indication of a carrier aggregation or dual connectivity configuration index corresponding to a carrier aggregation configuration or dual connectivity configuration preferred by the wireless device.

Additionally or alternatively to carrier aggregation or dual connectivity preference information for the wireless device, the assistance information could include service data amount information for the wireless device. For example, the wireless device could determine an estimated amount of uplink and/or downlink data to be communicated based on access stratum layer information and/or application layer information, and include the estimated amount of uplink and/or downlink data to be communicated as part of the assistance information.

The cellular base station may determine whether to configure the wireless device for carrier aggregation or dual connectivity based at least in part on the assistance information. For example, if the wireless device has a relatively small service data amount and/or indicates a preference to not configure the wireless device for carrier aggregation or dual connectivity, this may contribute to the cellular base station determining to not configure the wireless device for carrier aggregation or dual connectivity. If the wireless device has a relatively large service data amount and/or indicates a preference to configure the wireless device for carrier aggregation or dual connectivity, this may contribute to the cellular base station determining to configure the wireless device for carrier aggregation or dual connectivity.

If the cellular base station determines to configure the wireless device for carrier aggregation or dual connectivity, the cellular base station may further determine a carrier aggregation or dual connectivity configuration for the wireless device based at least in part on the assistance information. For example, if the wireless device indicates one or more preferred frequencies for carrier aggregation and/or dual connectivity, this may contribute to the cellular base station determining to select one (or more) of the indicated preferred frequencies to include in the carrier aggregation or dual connectivity configuration for the wireless device. Likewise, if the wireless device indicates that a previously used carrier aggregation or dual connectivity configuration can be reused, this may contribute to the cellular base station determining to select the previously used carrier aggregation or dual connectivity configuration for the wireless device. Still further, if the wireless device indicates a preference for a specific carrier aggregation or dual connectivity configuration (e.g., by signaling a carrier aggregation configuration index or dual connectivity configuration index associated with the preferred carrier aggregation or dual connectivity configuration), this may contribute to the cellular base station determining to select the preferred carrier aggregation or dual connectivity configuration for the wireless device.

In 704, the cellular base station may provide carrier aggregation or dual connectivity configuration information based at least in part on the assistance information. The carrier aggregation or dual connectivity configuration information may configure the wireless device for the carrier aggregation or dual connectivity configuration selected for the wireless device by the cellular base station.

Once the wireless device is configured for carrier aggregation or dual connectivity, the cellular base station may provide an indication to the wireless device to activate the carrier aggregation or dual connectivity. Once activated, the wireless device may communicate with the cellular base station (e.g., and possibly one or more other cellular base stations, depending on the configuration) according to the configured carrier aggregation or dual connectivity arrangement.

Note that in some instances, it may be possible for the cellular base station to indicate to the wireless device to activate a carrier aggregation or dual connectivity configuration without explicitly configuring the wireless device for the configuration. For example, in a scenario in which the wireless device specifies a preferred carrier aggregation or dual connectivity configuration (e.g., by indicating a carrier aggregation configuration index or dual connectivity configuration index to the cellular base station as part of the assistance information), the preferred configuration may be considered to be implicitly configured at the wireless device, and so if the cellular base station selects the preferred configuration for the wireless device, the cellular base station may be able to provide an indication to the wireless device to activate that configuration without explicitly providing an indication configuring it to the wireless device.

Thus, by utilizing an assistance information framework capable of providing assistance information early in a RRC connection, such as during setup, establishment, and/or resumption of a RRC connection, it may be possible for a wireless device to be quickly and accurately configured for carrier aggregation or dual connectivity operation, which may in turn increase the data throughput of the wireless device in scenarios in which more quickly obtaining higher data throughput is beneficial to the wireless device, among other possible benefits, at least according to some embodiments.

FIGS. 8-15 and Additional Information

FIGS. 8-15 and the following additional information are provided by way of example of various considerations and details relating to possible systems in which the method of FIG. 7 and/or other aspects of this disclosure may be implemented, and are not intended to be limiting to the disclosure as a whole. Numerous variations and alternatives to the details provided herein below are possible and should be considered within the scope of the disclosure.

Figure 8:
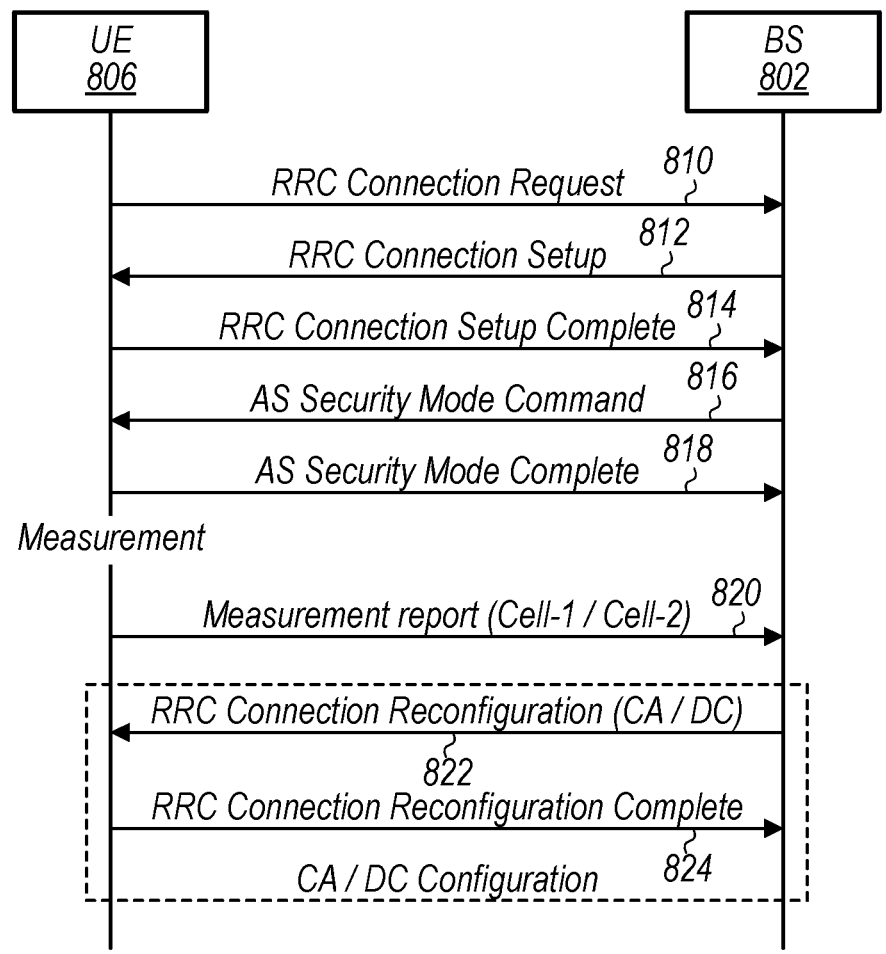
FIGS. 8-15 illustrate exemplary aspects of various possible signaling options for carrier aggregation and dual connectivity configuration, according to some embodiments.
Figure 9:
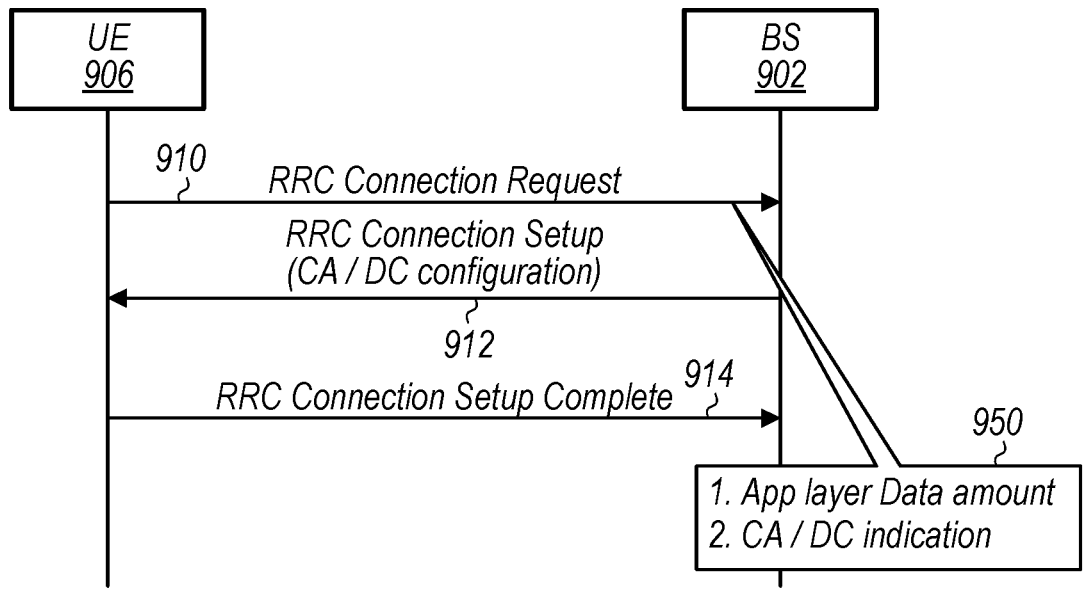

FIG. 8 illustrates signal flow for an example CA/DC configuration procedure in which no framework is in place for providing assistance information for CA/DC configuration, and in which measurement reporting and CA/DC configuration is allowed only after AS security activation, according to some embodiments.

As shown, the signal flow may include a UE 806 providing a RRC connection request 810 to a cellular base station 802 (e.g., a eNB or gNB), the base station 802 providing a RRC connection setup message 812 to the UE 806, and the UE 806 responding with a RRC connection setup complete message 814. The UE 806 and the network may then establish access stratum (AS) security, including the base station 802 providing an AS security mode command 816, and the UE 806 responding with an AS security mode complete message 818. Once the RRC connection is established and AS security is activated, the UE 806 may perform neighbor cell measurements, and provide a measurement report 820 to the BS 802.

According to such a design, the network may configure CA/DC based on neighbor cell measurement results, e.g., based on the measurement report 820. This may include the base station 802 providing a RRC connection reconfiguration indication 822 with CA/DC configuration information, and the UE 806 responding with a RRC connection reconfiguration complete indication 824. Note that the decision to configure CA/DC, and/or the specific CA/DC configuration selected, may further be based at least in part on the UE's current data amount information, (e.g., downlink data amount based on the data amount in the downlink queue buffer on the network side, and the uplink data amount based on buffer status report (BSR) reporting from the UE), and/or any of various possible base station policy considerations.

Since according to such a scheme, the UE may only be allowed to transmit measurement reports to the network after AS security activation, and similarly CA/DC configuration may only be allowed after AS security activation, there may be a substantial minimum delay to configure CA/DC; for example, as one possibility, it may be the case that a 30 ms to is delay could be possible, according to some embodiments. Note that this range is provided by way of example only, and that other possible delay ranges to configure CA/DC according to such a scheme may also be possible.

As an alternative to such a scheme, it may be possible for the network to blindly configure CA/DC, e.g., without any UE radio quality or service data amount information, e.g., to more quickly configure CA/DC. Such blind CA/DC configuration may lead to additional power consumption by the UE, e.g., relative to non-CA or non-DC configuration, possibly even if a configured CA or DC scheme is not activated. For example, for CA, a UE may be required to perform measurement on the configured secondary cell(s). Further, for DC, a UE may be required to perform radio link monitoring in addition to the secondary cell measurement(s). In the case of secondary cell group failure, performing a RACH procedure on the master cell group primary cell may also be required. Thus, this additional power consumption may have a negative impact on the UE, at least in some instances, for example if the UE's service does not require a sufficiently large amount of data transmission to justify CA/DC configuration, and/or if channel conditions for potential secondary cells are poor.

Accordingly, it may be beneficial to provide a framework for CA/DC configuration that can potentially be both fast and accurate, at least according to some embodiments. Such a framework may include a mechanism for UEs to quickly report assistance information for facilitating CA/DC configuration, potentially including during the initial access procedure. For example, the assistance information could be provided when performing a RRC connection setup procedure while transitioning from RRC idle to RRC connected mode, or when performing a RRC resume procedure while transitioning from RRC inactive to RRC connected mode.

The assistance information could include any or all of various possible types and amounts of information. As one possibility, the assistance information could include information indicating the UE's preferences for CA/DC configuration, such as a 1-bit or 2-bit indication of the CA/DC preference (e.g., whether or not CA/DC is preferred, a preference among CA/DC/either/neither, etc.), a UE preferred and/or non-preferred CA/DC frequency list (e.g., based on measurements, UE capabilities/preferences, etc.), whether a previous CA/DC configuration (full or subset) can be reused, or a pre-configured CA/DC configuration index. As another possibility, the assistance information could include UE service data amount information. For example, access stratum layer data amount information could be used to determine how much uplink data the UE has to transmit, and/or application layer data amount information could be used to determine both how much uplink data the UE has to transmit and how much downlink data the UE expects to receive.

The assistance information could be provided at any of a variety of times. According to some embodiments, the assistance information could be reported in conjunction with (e.g., during) an RRC connection setup procedure, e.g., when transitioning from RRC idle mode to RRC connected mode. In such a case, as one possibility, the assistance information can be included in the RRC connection request message, such as illustrated in the example signal flow of FIG. 9. As shown, in the illustrated example, a UE 906 may provide a RRC connection request 910 to a BS 902. Note that the assistance information 950 may be limited to relatively compact types of assistance information in this scenario, such as including an application layer data amount and/or a CA/DC indication, at least in some instances, e.g., since the payload of the RRC connection request may have a somewhat limited number of bits available for the assistance information. However, providing the assistance information with the RRC connection request 910 may allow for a very fast informed CA/DC configuration; in 912, the BS 902 may provide a RRC connection setup message which may include CA/DC configuration information. The UE 906 may respond with a RRC connection setup complete message 914, at which point the RRC connection may be established and CA/DC may already be configured.

Figure 10:
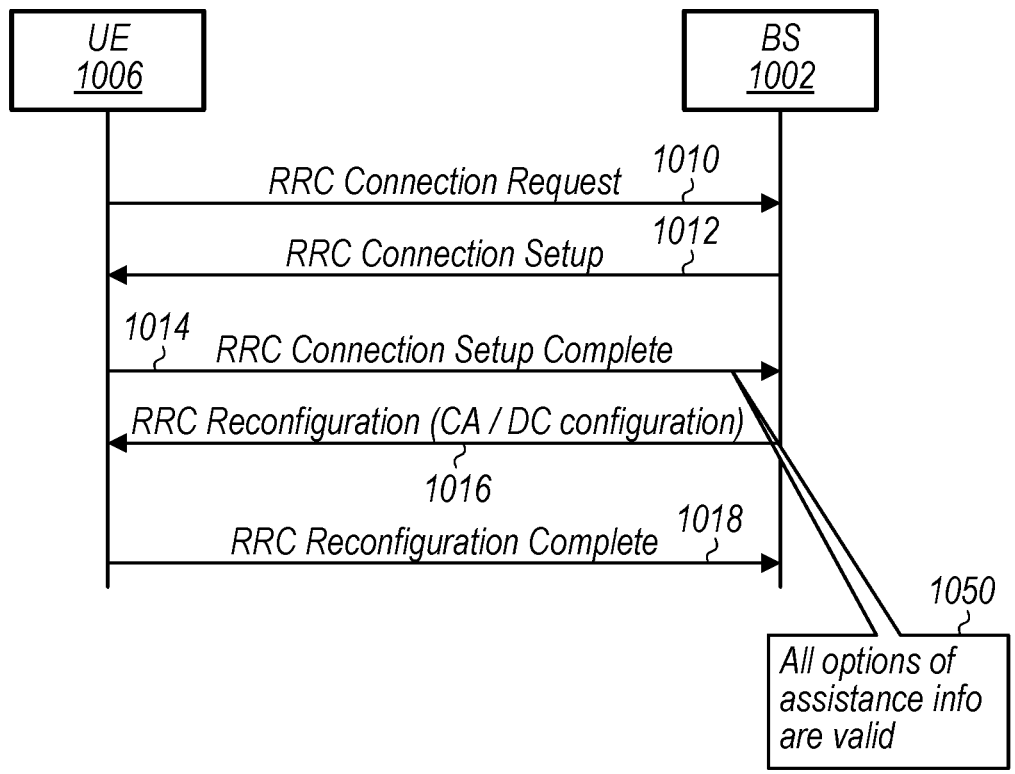

As another possibility, the assistance information can be included in the RRC connection setup complete message, such as illustrated in the example signal flow of FIG. 10. As shown, in the illustrated example, a UE 1006 may provide a RRC connection request 1010 to a BS 1002. In 1012, the BS 1002 may provide a RRC connection setup message to the UE 1006. The UE 1006 may respond with a RRC connection setup complete message 1014, which may include the assistance information 1050. In this case, as payload may be more flexible, it may be possible to include any of the various possible types and amounts of assistance information, at least according to some embodiments. Based at least in part on the assistance information 1050, the BS 1002 may provide a RRC reconfiguration message 1016, which may include CA/DC configuration information. The UE 1006 may respond with a RRC reconfiguration complete message 1018, at which point CA/DC may be configured.

Figure 11:
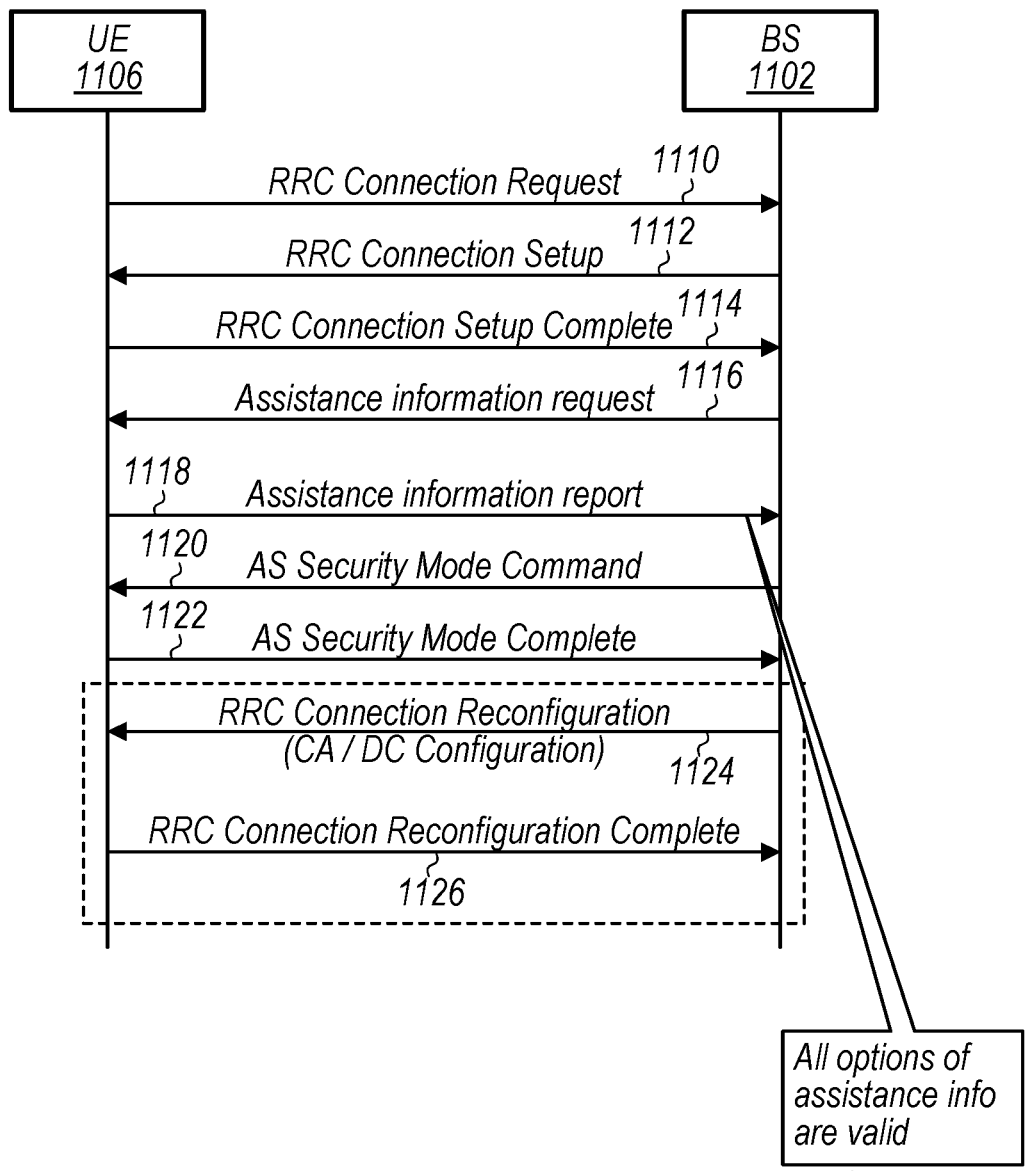
Figure 12:
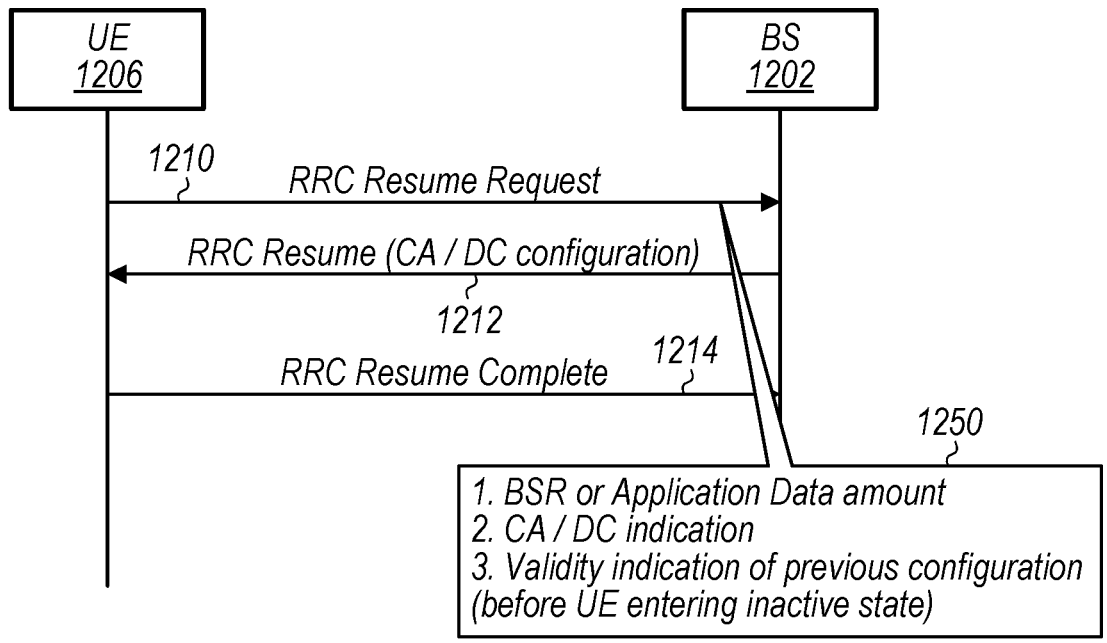

As still another possibility, the assistance information can be included in an assistance information report after completing a RRC connection setup procedure, such as illustrated in the example signal flow of FIG. 11. As shown, in the illustrated example, a UE 1106 may provide a RRC connection request 1110 to a BS 1102. In 1112, the BS 1102 may provide a RRC connection setup message to the UE 1106. The UE 1106 may respond with a RRC connection setup complete message 1114. The BS 1102 may follow up with an assistance information request 1116, to which the UE 1106 may respond with an assistance information report 1118, which may include the assistance information 1150. Similar to the scenario of FIG. 10, in this case, as payload may be more flexible, it may be possible to include any of the various possible types and amounts of assistance information, at least according to some embodiments. In this example scenario, the BS 1102 may further provide an access stratum security mode command 1120 to establish access stratum level security. The UE 1106 may respond with an access stratum security mode complete message 1122. Based at least in part on the assistance information 1150, the BS 1102 may then provide a RRC reconfiguration message 1124, which may include CA/DC configuration information. The UE 1106 may respond with a RRC reconfiguration complete message 1126, at which point CA/DC may be configured.

According to some embodiments, the assistance information could also or alternatively be reported in conjunction with (e.g., during) an RRC resume procedure, e.g., when transitioning from RRC inactive mode to RRC connected mode. In such a case, as one possibility, the assistance information can be included in the RRC resume request message, such as illustrated in the example signal flow of FIG. 12. As shown, in the illustrated example, a UE 1206 may provide a RRC resume request 1210 to a BS 1202. Note that the assistance information 1250 may be limited to relatively compact types of assistance information in this scenario, such as including a buffer status report or application layer data amount, a CA/DC indication, and/or a validity indication of a previous configuration (e.g., used by the UE before entering the RRC inactive mode), at least in some instances, e.g., since the payload of the RRC resume request may have a somewhat limited number of bits available for the assistance information. However, providing the assistance information with the RRC resume request 1210 may allow for a very fast informed CA/DC configuration; in 1212, the BS 1202 may provide a RRC resume message which may include CA/DC configuration information. The UE 1206 may respond with a RRC resume complete message 1214, at which point the RRC connection may be established and CA/DC may already be configured.

Figure 13:
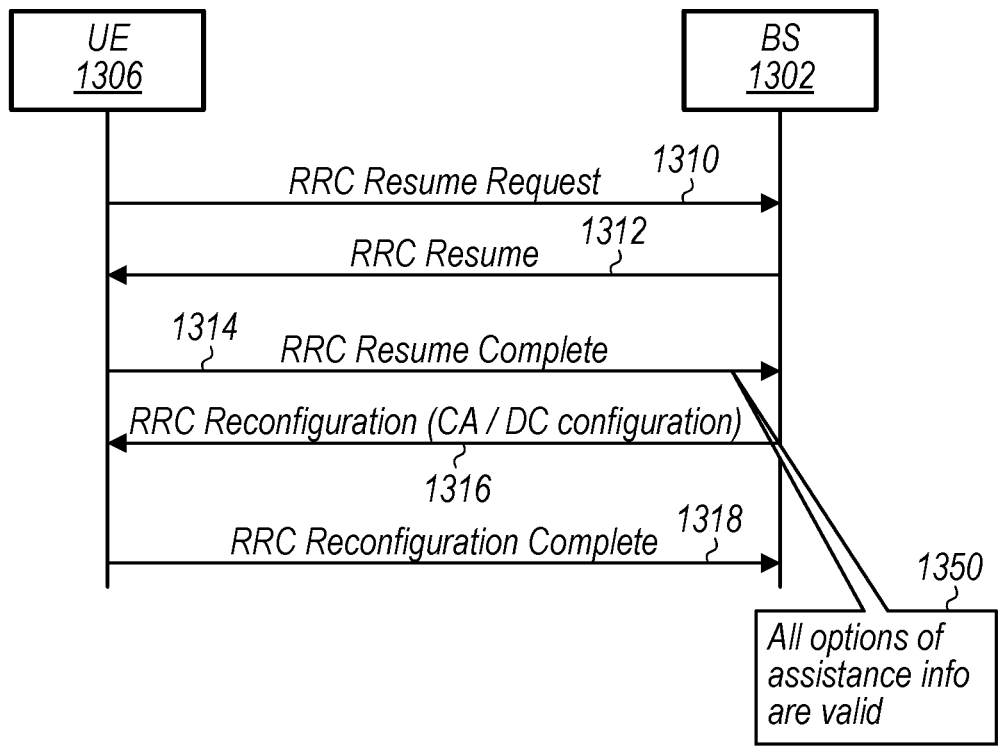

As another possibility, the assistance information can be included in the RRC resume complete message, such as illustrated in the example signal flow of FIG. 13. As shown, in the illustrated example, a UE 1306 may provide a RRC resume request 1310 to a BS 1302. In 1312, the BS 1302 may provide a RRC resume message to the UE 1306. The UE 1306 may respond with a RRC resume complete message 1314, which may include the assistance information 1350. In this case, as payload may be more flexible, it may be possible to include any of the various possible types and amounts of assistance information, at least according to some embodiments. Based at least in part on the assistance information 1350, the BS 1302 may provide a RRC reconfiguration message 1316, which may include CA/DC configuration information. The UE 1306 may respond with a RRC reconfiguration complete message 1318, at which point CA/DC may be configured.

Figure 14:
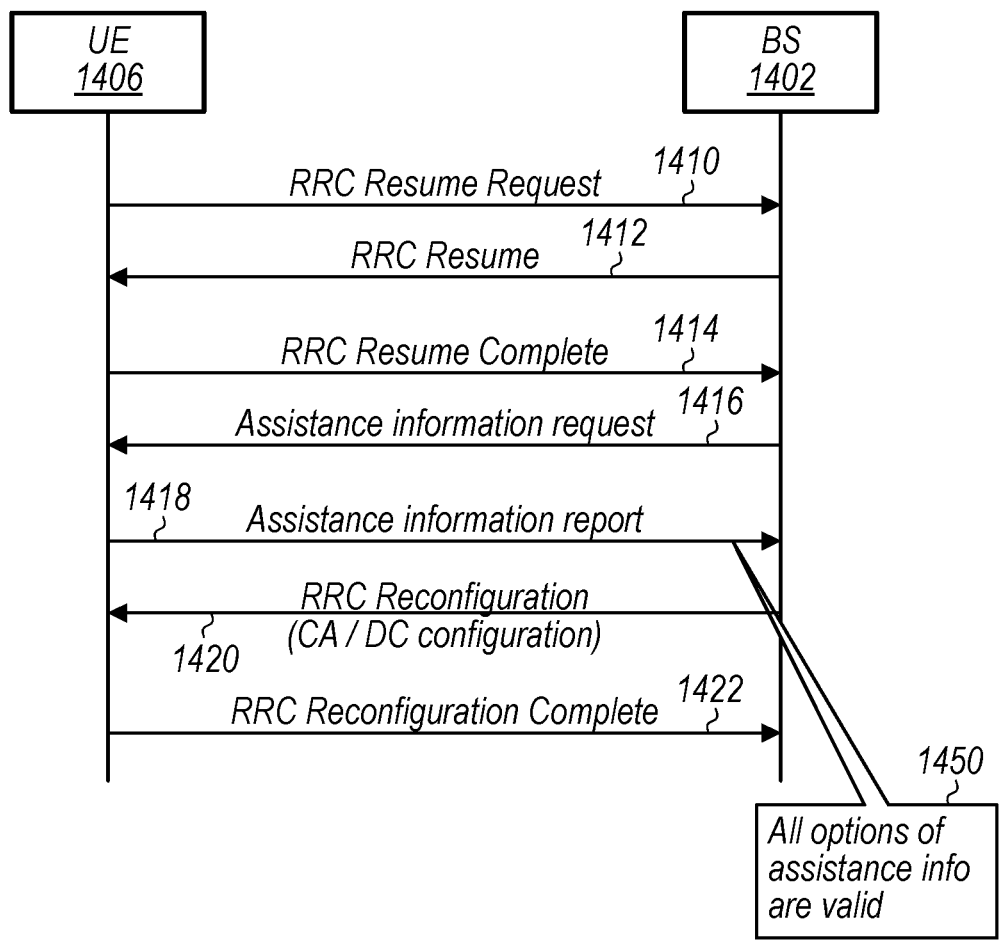

As still another possibility, the assistance information can be included in an assistance information report after completing a RRC resume procedure, such as illustrated in the example signal flow of FIG. 14. As shown, in the illustrated example, a UE 1406 may provide a RRC resume request 1410 to a BS 1402. In 1412, the BS 14102 may provide a RRC resume message to the UE 1406. The UE 1406 may respond with a RRC resume complete message 1414. The BS 1402 may follow up with an assistance information request 1416, to which the UE 1406 may respond with an assistance information report 1418, which may include the assistance information 1450. Similar to the scenario of FIG. 13, in this case, as payload may be more flexible, it may be possible to include any of the various possible types and amounts of assistance information, at least according to some embodiments. Based at least in part on the assistance information 1450, the BS 1402 may provide a RRC reconfiguration message 1420, which may include CA/DC configuration information. The UE 1406 may respond with a RRC reconfiguration complete message 1422, at which point CA/DC may be configured.

Figure 15:
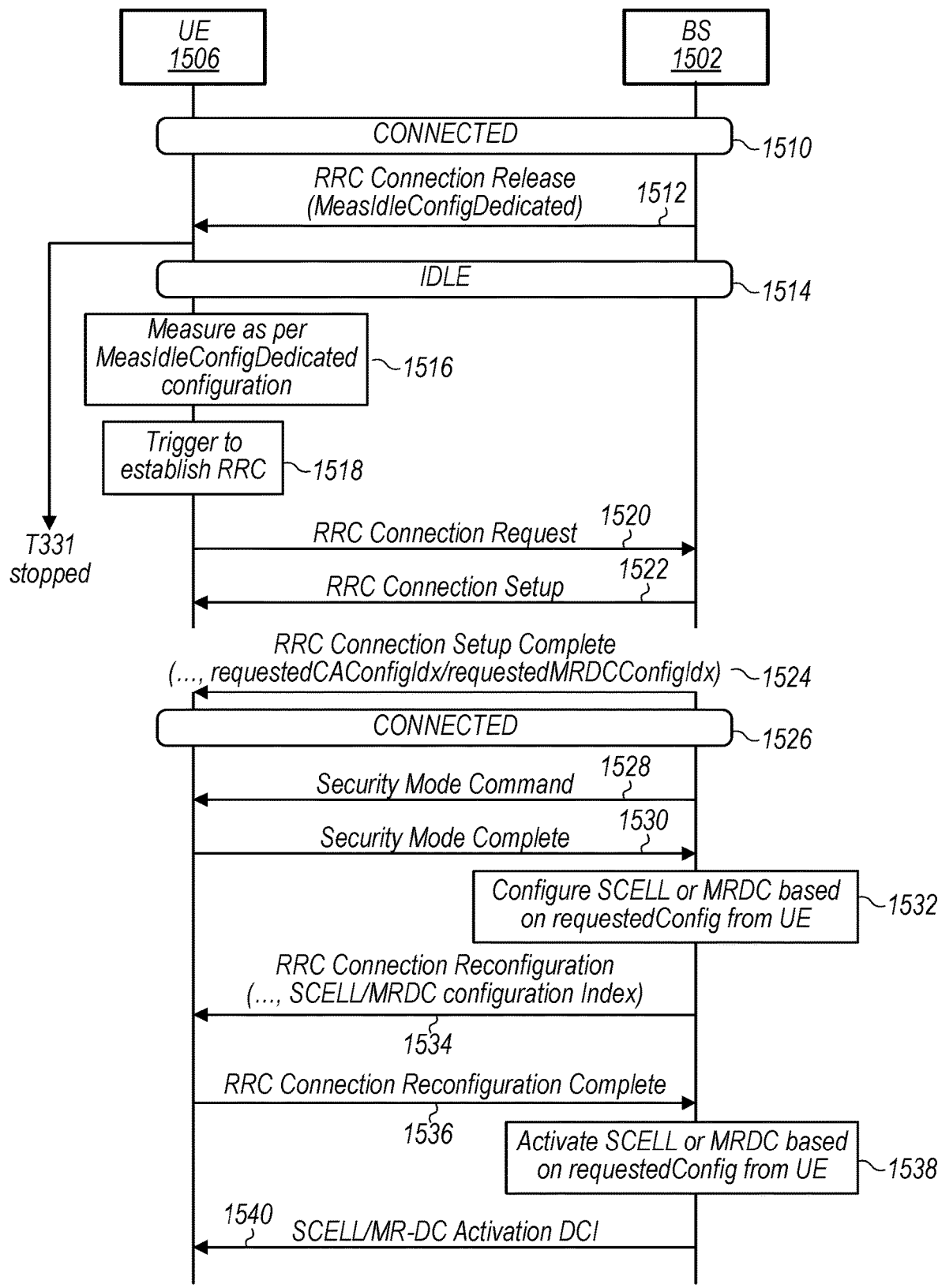

As previously noted, in some instances the UE assistance information could include a pre-configured configuration index for a preferred CA/DC configuration. FIG. 15 is a signal flow diagram illustrating further details of how such an arrangement could proceed, at least according to some embodiments. As shown, in 1510, a UE 1506 and a BS 1502 may have established a RRC connection. In 1512, the BS 1502 may release the RRC connection, and may include a MeasIdleConfigDedicated information element (IE) with the RRC connection release message. As part of this IE, the network may be able to configure the configuration indices that the UE supports (e.g., taking into account the UE device capability) to the UE, where each pre-configuration index points to a configuration for a specific carrier aggregation or multi-RAT dual-connectivity (MR-DC) combination defined by the network. This IE may further configure the UE to perform measurements on the relevant frequencies for the configured configuration indices while in idle mode.

In 1514, the UE 1506 may transition to RRC idle and start a T331 timer. Based on the measIdleConfiDedicated IE in the RRC connection release message (or alternatively, based on system information provided in system information block 5 (SIB5), as another possibility), in 1516, the UE 1506 may perform the configured measurements. In 1518, the UE 1506 may detect a trigger to establish an RRC connection (e.g., based on data buffer levels, a paging indication from the network, or any of various other possible triggers). If the T331 timer is running when the trigger occurs (or more generally, if the UE has current measurements for relevant configured neighbor cells), the UE may determine a preferred SCELL or MR-DC configuration (or set of configurations) from the pool of configuration indices that the network provided in the RRC connection release message. In 1520, the UE 1506 may transmit a RRC connection request, to which the BS 1502 may respond with a RRC connection setup message 1522. In 1524, the UE 1506 may provide a RRC connection setup complete message, which may include one or more (e.g., among other information) 'requestedCAConfigIdx' or 'requestedMRDCConfigIdx' parameters indicating the preferred SCELL or MR-DC configuration or set of configurations. This may complete the RRC connection setup procedure, and so in 1526, the UE 1506 may again be in RRC connected mode. In the illustrated scenario, the BS 1502 may provide a security mode command 1528, to which the UE 1506 may respond with a security mode complete message 1530. After security setup, in 1532, the network may configure a SCELL or MR-DC configuration based on the UE's recommendation, e.g., by sending an indication of the pre-configured configuration index corresponding to the SCELL or MR-DC configuration to the UE 1506 in a RRC connection reconfiguration message 1534 and receiving a RRC connection reconfiguration complete message 1536 from the UE 1506 in response. In 1538, the BS 1502 may activate the configured SCELL or MR-DC configuration, e.g., by providing a SCELL/MR-DC activation downlink control information 1540 to the UE 1506. Alternatively, the network may be able to activate the configuration index that the UE requests in the RRC connection setup complete without explicitly configuring it by way of a RRC connection reconfiguration exchange, at least according to some embodiments.

Thus, an assistance information framework for providing early assistance information for determining a carrier aggregation or dual connectivity configuration for a wireless device may help the network to perform fast and accurate CA/DC configuration, taking into account the needs of the UE's service(s) the UE's preference(s), and radio quality/conditions. In addition to reducing the latency to accurately configure a secondary cell or dual connectivity configuration, such an approach may also reduce the signaling burden to configure and activate a secondary cell or dual connectivity configuration, e.g., depending on the implementation approach used for the assistance information framework, at least according to some embodiments.

In the following further exemplary embodiments are provided.

One set of embodiments may include an apparatus for operating a wireless device, comprising: a processor configured to cause the wireless device to: provide assistance information for determining a carrier aggregation or dual connectivity configuration to a cellular base station, wherein the assistance information is provided while establishing a radio resource control (RRC) connection with the cellular base station; and receive carrier aggregation or dual connectivity configuration information from the cellular base station in response to the assistance information.

According to some embodiments, the processor is further configured to cause the wireless device to: provide the assistance information during a RRC connection setup procedure while transitioning from RRC idle mode to RRC connected mode.

According to some embodiments, the processor is further configured to cause the wireless device to: provide the assistance information during a RRC resume procedure while transitioning from RRC inactive mode to RRC connected mode.

According to some embodiments, the assistance information includes an indication of whether the wireless device prefers to be configured for at least one of carrier aggregation or dual connectivity or to not be configured for either of carrier aggregation or dual connectivity.

According to some embodiments, the assistance information includes an indication of one or more preferred and/or non-preferred carrier aggregation or dual connectivity frequencies.

According to some embodiments, the assistance information includes an indication of whether a previous carrier aggregation or dual connectivity configuration can be reused.

According to some embodiments, the processor is further configured to cause the wireless device to: receive information pre-configuring a plurality of carrier aggregation or dual connectivity configuration indices corresponding to a plurality of carrier aggregation or dual connectivity configurations, wherein the assistance information includes an indication of a carrier aggregation or dual connectivity configuration index corresponding to a preferred carrier aggregation or dual connectivity configuration.

According to some embodiments, the processor is further configured to cause the wireless device to: determine an estimated amount of uplink data to be communicated based at least in part on access stratum layer information, wherein the assistance information includes the estimated amount of uplink data to be communicated.

According to some embodiments, the processor is further configured to cause the wireless device to: determine an estimated amount of uplink and/or downlink data to be communicated based at least in part on application layer information, wherein the assistance information includes the estimated amount of uplink and/or downlink data to be communicated.

Another set of embodiments may include a wireless device, comprising: an antenna; a radio coupled to the antenna; and a processing element coupled to the radio; wherein the wireless device is configured to: provide assistance information for determining a carrier aggregation or dual connectivity configuration to a cellular base station; and receive carrier aggregation or dual connectivity configuration information from the cellular base station in response to the assistance information, wherein the assistance information includes one or more of: carrier aggregation or dual connectivity preference information for the wireless device, or service data amount information for the wireless device.

According to some embodiments, the assistance information is provided with a RRC connection request message.

According to some embodiments, the assistance information is provided with a RRC connection setup complete message.

According to some embodiments, the assistance information is provided with a RRC resume request message.

According to some embodiments, the assistance information is provided with a RRC resume complete message.

According to some embodiments, the assistance information is provided with an assistance information report provided in response to an assistance information request received from the cellular base station.

Yet another set of embodiments may include a cellular base station, comprising: an antenna; a radio coupled to the antenna; and a processing element coupled to the radio; wherein the cellular base station is configured to: receive assistance information for determining a carrier aggregation or dual connectivity configuration from a wireless device, wherein the assistance information is received while establishing a radio resource control (RRC) connection with the wireless device; determine a carrier aggregation or dual connectivity configuration for the wireless device based at least in part on the assistance information; and provide an indication to the wireless device to activate the determined carrier aggregation or dual connectivity configuration.

According to some embodiments, the cellular base station is further configured to: determine one or more possible carrier aggregation or dual connectivity configurations for the wireless device based at least on wireless device capability information; and provide information to the wireless device indicating a configuration index for each of the one or more possible carrier aggregation or dual connectivity configurations for the wireless device, wherein the assistance information includes an indication of a configuration index corresponding to a carrier aggregation or dual connectivity configuration preferred by the wireless device.

According to some embodiments, to determine the carrier aggregation or dual connectivity configuration, the cellular base station is further configured to select the carrier aggregation or dual connectivity configuration preferred by the wireless device, wherein the indication to the wireless device to activate the determined carrier aggregation or dual connectivity configuration is provided without explicitly providing an indication configuring the determined carrier aggregation or dual connectivity configuration based at least in part on the carrier aggregation or dual connectivity configuration preferred by the wireless device being selected as the determined carrier aggregation or dual connectivity configuration.

According to some embodiments, the cellular base station is further configured to: provide configuration information for the determined carrier aggregation or dual connectivity configuration to the wireless device.

According to some embodiments, the assistance information includes one or more of: an indication of a preference whether to configure the wireless device for one or more of carrier aggregation or dual connectivity; an indication of one or more preferred or non-preferred carrier aggregation or dual connectivity frequencies; an indication of a preference whether to reuse at least part of a previous carrier aggregation or dual connectivity configuration used by the wireless device; or service data amount information for the wireless device.

Another set of embodiments may include an apparatus, comprising: a processor configured to cause a device to perform any or all parts of the preceding examples.

Yet another exemplary embodiment may include a method, comprising: performing, by a device, any or all parts of the preceding examples.

Still another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

A yet further exemplary set of embodiments may include an apparatus comprising means for performing any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a wireless device to:
provide a user equipment (UE) assistance information message including an indication, comprising one or more bits, of a preference for a dual connectivity configuration for communication to a cellular base station via a master cell group (MCG) and a secondary cell group (SCG), the preference including activation of the SCG, wherein the UE assistance information message is provided in a radio resource control (RRC) message to the cellular base station; and
receive, from the cellular base station, first information indicating activation of the SCG and activation of a dual connectivity configuration for communication via the MCG and the SCG based on the UE assistance information message, wherein the dual connectivity configuration for communication via the MCG and the SCG was pre-configured at the wireless device before receiving the first information.

2. The apparatus of claim 1, wherein the processor is further configured to cause the wireless device to:
provide the UE assistance information message during a RRC connection setup procedure while transitioning from RRC idle mode to RRC connected mode.

3. The apparatus of claim 1, wherein the processor is further configured to cause the wireless device to:
provide the UE assistance information message during a RRC resume procedure while transitioning from RRC inactive mode to RRC connected mode.

4. The apparatus of claim 1,
wherein the UE assistance information message includes an indication of one or more preferred and/or non-preferred dual connectivity frequencies.

5. The apparatus of claim 1,
wherein the UE assistance information message includes an indication of whether a previous dual connectivity configuration for communication via the MCG and the SCG can be reused.

6. The apparatus of claim 1, wherein the processor is further configured to cause the wireless device to:
receive second information pre-configuring a plurality of carrier aggregation configuration indices corresponding to a plurality of carrier aggregation configurations for communication via the MCG and the SCG,
wherein the UE assistance information message includes an indication of a carrier aggregation configuration index corresponding to a preferred carrier aggregation configuration for communication via the MCG and the SCG.

7. The apparatus of claim 1, wherein the processor is further configured to cause the wireless device to:
determine an estimated amount of uplink data to be communicated based at least in part on access stratum layer information,
wherein the UE assistance information message includes the estimated amount of uplink data to be communicated.

8. The apparatus of claim 1, wherein the processor is further configured to cause the wireless device to:
determine an estimated amount of uplink and/or downlink data to be communicated based at least in part on application layer information,
wherein the UE assistance information message includes the estimated amount of uplink and/or downlink data to be communicated.

9. The apparatus of claim 1, wherein the first information indicates activation of the dual connectivity configuration for communication via the MCG and the SCG without explicitly providing a configuration to the wireless device.

10. A wireless device, comprising:
an antenna;
a radio coupled to the antenna; and
a processing element coupled to the radio;
wherein the wireless device is configured to:
provide a user equipment (UE) assistance information message including an indication, comprising one or more bits, of a preference for a dual connectivity configuration for communication to a cellular base station via a master cell group (MCG) and a secondary cell group (SCG), the preference including activation of the SCG, wherein the UE assistance information message is provided in a radio resource control (RRC) message to the cellular base station; and
receive, from the cellular base station, first information indicating activation of the SCG and activation of a dual connectivity configuration for communication via the MCG and the SCG based on the UE assistance information message, wherein the dual connectivity configuration for communication via the MCG and the SCG was pre-configured at the wireless device before receiving the first information.

11. The wireless device of claim 10,
wherein the RRC message is a RRC connection request message.

12. The wireless device of claim 10,
wherein the RRC message is a RRC connection setup complete message.

13. The wireless device of claim 10,
wherein the RRC message is a RRC resume complete message.

14. The wireless device of claim 10,
wherein the UE assistance information message is provided with an assistance information report provided in response to an assistance information request received from the cellular base station.

15. The wireless device of claim 10, wherein the first information indicates activation of the dual connectivity configuration for communication via the MCG and the SCG without explicitly providing a configuration to the wireless device.

16. The wireless device of claim 10, wherein the wireless device is further configured to:
provide the UE assistance information message during a RRC connection setup procedure while transitioning from RRC idle mode to RRC connected mode.

17. The wireless device of claim 10, wherein the wireless device is further configured to:
provide the UE assistance information message during a RRC resume procedure while transitioning from RRC inactive mode to RRC connected mode.

18. The wireless device of claim 10, wherein the UE assistance information message includes an indication of one or more preferred and/or non-preferred dual connectivity frequencies.

19. A cellular base station, comprising:
an antenna;
a radio coupled to the antenna; and
a processing element coupled to the radio;
wherein the cellular base station is configured to:
receive, from a wireless device, a user equipment (UE) assistance information message including an indication, comprising one or more bits, of a preference for dual connectivity for communication via a master cell group (MCG) and a secondary cell group (SCG), the preference including activation of the SCG, wherein the UE assistance information message is received in a radio resource control (RRC) message to the cellular base station;
determine a dual connectivity configuration for communication via the MCG and the SCG for the wireless device based at least in part on the UE assistance information message; and
provide first information to the wireless device to activate the determined dual connectivity configuration for communication via the MCG and the SCG, wherein the determined dual connectivity configuration for communication via the MCG and the SCG was pre-configured at the wireless device before providing the first information.

20. The cellular base station of claim 19, wherein the first information indicates activation of the determined dual connectivity configuration for communication via the MCG and the SCG without explicitly providing a configuration to the wireless device.

* * * * *